Nov. 10, 1931.  G. B. ASHWORTH  1,830,976
ECCENTRIC CRANK
Filed July 28, 1928   2 Sheets-Sheet 1
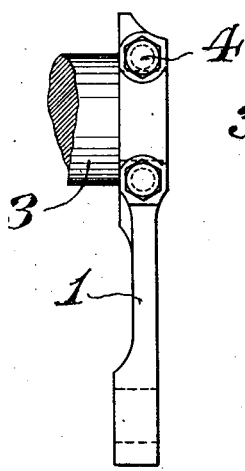
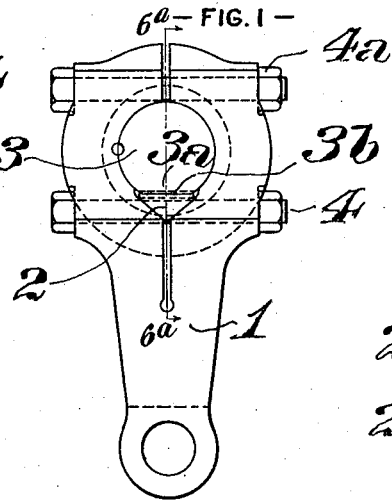
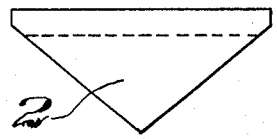
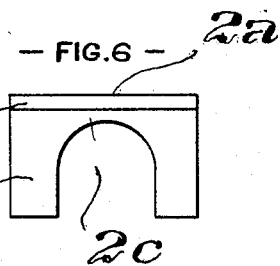
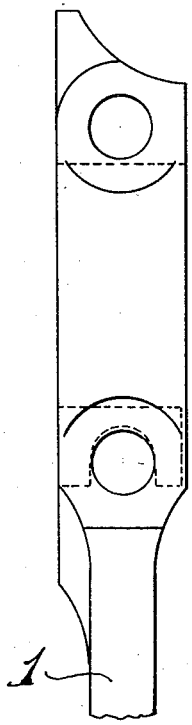
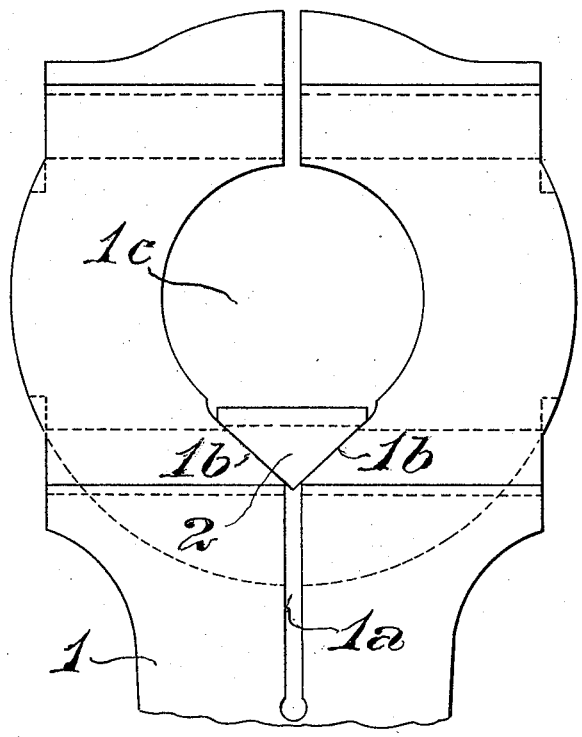

Nov. 10, 1931.    G. B. ASHWORTH    1,830,976
ECCENTRIC CRANK
Filed July 28, 1928    2 Sheets-Sheet 2
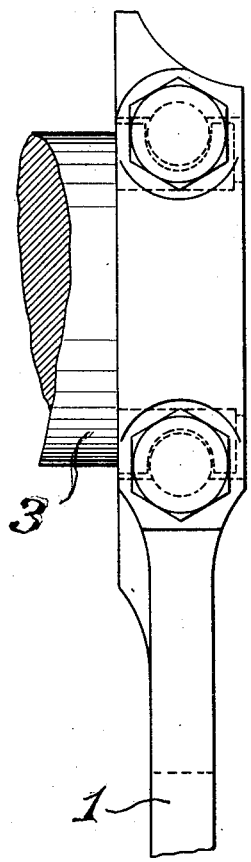
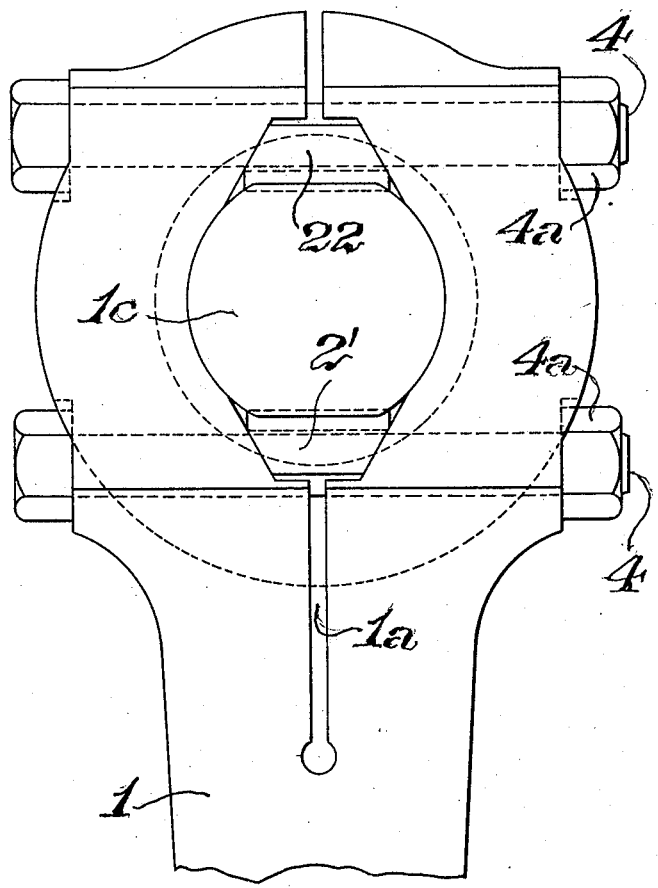
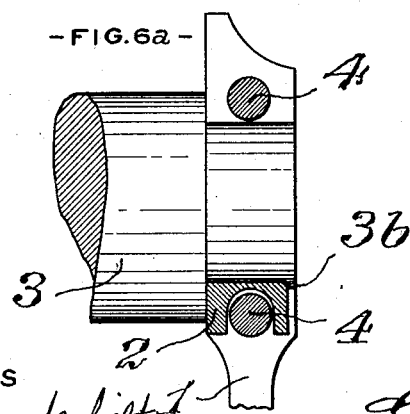

Patented Nov. 10, 1931

1,830,976

UNITED STATES PATENT OFFICE

GEORGE B. ASHWORTH, OF AMSTERDAM, NEW YORK

ECCENTRIC CRANK

Application filed July 28, 1928. Serial No. 295,908.

This invention relates, generally, to eccentric cranks applied in connection with crank pins of locomotive engines for the attachment of valve gear members, and particularly to the means for attaching said eccentric cranks to the crank pins. The object of the invention is to provide a more secure and efficient means for fastening the eccentric crank to the crank pin than is afforded by the key of present practice, as well as to provide for the ready and quick removal of the securing means, when it is desired to remove the crank arm from the crank pin for the application of a driving rod.

The improvement claimed is hereinafter fully set forth.

In the accompanying drawings: Figure 1 is a side view, in elevation, of an eccentric crank, assembled on the crank pin of a locomotive, illustrating an embodiment of the invention; Fig. 2, an end view, in elevation, thereof; Fig. 3, a view, taken correspondingly to Fig. 1, and on an enlarged scale, the crank pin and fastening bolts being omitted; Fig. 4, an end view, in elevation, of the same; Fig. 5 a side view in elevation of the fastening key; Fig. 6, an end view, in elevation, thereof; Fig. 6a, a view, partly in elevation and partly in section, of one end portion of the crank pin, and connected eccentric crank; Fig. 7, a view, taken similarly to Fig. 3, showing a modification of structural detail, and; Fig. 8, an end view, in elevation of the same.

Prior to the present invention, it has been the practice to secure the eccentric crank against rotation on the crank pin, by means of a key, of rectangular cross section, inserted partially in the crank pin and partially in the eccentric crank, rectangular channels being formed in the crank pin and eccentric crank, respectively, for this purpose. The limited bearing area of such a key, to oppose undesired rotation upon the crank pin, when subjected to the stresses incident upon the normal operation of the locomotive, has been found insufficient to hold the arm securely. The present invention provides a materially increased bearing area of the holding means, without, in any degree, weakening the structure of the eccentric crank, as would be the case if the ordinary form of rectangular key was merely enlarged to afford the desired increase in bearing area.

In the practice of the invention, referring descriptively to the specific embodiment thereof which is herein exemplified, the eccentric crank, 1, is generally of the ordinary form, and its bore, 1c, is of diameter adapted to fit closely on the reduced end of the crank pin, 3. A slot, 1a, is cut in the crank arm to enable the portion thereof thus bisected to be spread apart by wedges or other means, so that the arm may be readily placed upon the crank pin. After being fitted upon the crank pin, the wedges or other spreading means may be removed from the slot, and the eccentric crank caused to grip the crank pin tightly, by means of bolts, 4, and nuts, 4a.

Flat seats, 1b, are formed on the eccentric crank, and are adapted to bear against corresponding seats, 2b, formed on the key, 2. A flat seat, 3a, is formed on the crank pin, and is adapted to coact with a corresponding seat, 2a, on the key, 2. The seat, 3a, may be flat and continuous, or may be formed with an elevation or retaining flange, 3b, to prevent the key, 2, from working out in service. The key, 2, is of triangular cross section, and a transverse slot, 2c, is formed in it, to permit the passage of one of the bolts, 4, when assembled on the crank pin.

Figs. 7 and 8 illustrate a modification of structural detail, in which a second key, 22, of substantially similar form to the key, 2, hereinbefore described, is located in the slotted end portion of the eccentric crank, on the side of the crank pin bore, 1c, opposite that in which a key, 2', of similar design, is fitted. Clamping bolts, 4, provided with nuts, 4a, pass through a slot in each key, 22, 2' similarly to the clamping bolt of the key 2 hereinafter described.

In applying the invention, the eccentric crank and the bolts are assembled upon the crank pin, and located in the proper position for imparting the desired motion to the valve gear, being retained in such position by the compressing action of the bolts, 4, when they are tightened. The key, 2, is then shaped to bring into accurate juxtaposition and contact, the bearing faces, 2b, upon the faces, 1b, 1b, of the eccentric crank, and the face, 2a, upon the face, 3a, of the crank pin. The bolts, 4, are then loosened, the slot, 1a, allowing the eccentric crank to expand sufficiently to permit the application of the key, 2. When the key has been placed in position, the bolts, 4, are again tightened so that the inclined faces, 1b, coacting with the faces, 2b, of the key, in the manner of inclined planes, cause the key to be forced towards the crank pin, 3, thus bringing the seats, 2a and 3a, into forcible contact, and at the same time, causing the wall of the bore, 1c, of the crank arm, to tighten its grip on the crank pin, 3. The broad bearing area of the seats, 2b, and 1b, then offers materially greater resistance to the rotation of the crank arm upon the crank pin, than is exerted by the small rectangular key ordinarily employed.

In the method of assemblage above described, it will be obvious that if the seat, 3a, is made flat and continuous, the key, 2, may be applied by merely removing the bolts, 4, and inserting the key after expanding the crank arm. In case the seat, 3a, is provided with the retaining flange, 3b, the crank arm must be removed from the crank pin, the key, 2, inserted in position, and the crank arm slid over it into position for tightening by the bolts, 4.

In the process of assembling the crank arm on the pin, in its proper location, it is of advantage to locate the exact position by means of a dowel 23 at the junction of the pin and arm in the slot, 1a, said dowel being so placed as to coact with the bore of the crank arm, and the reduced portion of the pin on which it fits, as to retain them in their desired relative positions.

The invention claimed and desired to be secured by Letters Patent, is:

In combination an arm having a bore, a groove open to the bore with oppositely disposed walls converging from the bore, a slit open to the groove, a second groove open to the bore with oppositely disposed walls converging from the bore, and a second slit open to the second groove, said slits rendering the side portions thus formed at each side of the slits slightly flexible or yielding; a shaft fitting in the bore having circumferential portions thereof opposite the grooves of contours variably spaced from the axis of the shaft to provide shaft locking key seats; a key fitting each of the grooves each having a face engaging the respective seat and a pair of converging faces engaging the converging faces of the groove providing the only contact therebetween, whereby the said side portions are free to be moved toward each other to grip the shaft simultaneously with movements of the keys toward the shaft; and a bolt for each of the keys passing through the side portions for forcing the side portions toward each other to grip the shaft and to thereby move the respective keys firmly against the shaft in locking position.

GEORGE B. ASHWORTH.